(12) United States Patent
Lin et al.

(10) Patent No.: US 11,582,553 B2
(45) Date of Patent: Feb. 14, 2023

(54) ELECTRONIC MODULE HAVING TRANSDUCERS RADIATING ULTRASONIC WAVES

(71) Applicant: Advanced Semiconductor Engineering, Inc., Kaohsiung (TW)

(72) Inventors: Chih Lung Lin, Kaohsiung (TW); Kuei-Hao Tseng, Kaohsiung (TW); Kai Hung Wang, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 0 days.

(21) Appl. No.: 17/242,093

(22) Filed: Apr. 27, 2021

(65) Prior Publication Data
US 2022/0345812 A1   Oct. 27, 2022

(51) Int. Cl.
| | |
|---|---|
| H04R 1/40 | (2006.01) |
| H04R 1/26 | (2006.01) |
| H04R 3/12 | (2006.01) |
| G02C 11/00 | (2006.01) |
| H04R 1/24 | (2006.01) |

(52) U.S. Cl.
CPC ............ H04R 1/403 (2013.01); G02C 11/10 (2013.01); H04R 1/24 (2013.01); H04R 1/26 (2013.01); H04R 3/12 (2013.01); *H04R 2201/401* (2013.01)

(58) Field of Classification Search
None
See application file for complete search history.

(56) References Cited

U.S. PATENT DOCUMENTS

| | | | |
|---|---|---|---|
| 6,556,687 B1 * | 4/2003 | Manabe ............... | H04R 3/12 381/387 |
| 8,027,488 B2 * | 9/2011 | Pompei ............... | H04R 3/12 381/112 |
| 8,199,931 B1 * | 6/2012 | Norris ............... | H04R 17/00 381/89 |
| 8,750,541 B1 * | 6/2014 | Dong ............... | H04R 3/12 381/310 |
| 10,728,651 B2 | 7/2020 | Rusconi Clerici Beltrami et al. | |
| 2005/0195985 A1 * | 9/2005 | Croft, III ............... | H04R 17/00 367/137 |
| 2016/0112808 A1 * | 4/2016 | Geiger ............... | H04R 31/00 381/113 |
| 2016/0114193 A1 * | 4/2016 | Prus ............... | G10K 11/18 367/137 |
| 2017/0144190 A1 * | 5/2017 | Hoshi ............... | H04R 1/40 |

* cited by examiner

*Primary Examiner* — James K Mooney
(74) *Attorney, Agent, or Firm* — Foley & Lardner LLP (57) ABSTRACT

An electronic module is provided. The electronic module includes a first transducer and a second transducer. The first transducer is configured to radiate a first ultrasonic wave. The second transducer is configured to radiate a second ultrasonic wave. The first transducer and the second transducer are disposed on noncoplanar surfaces.

11 Claims, 6 Drawing Sheets

ELECTRONIC MODULE HAVING TRANSDUCERS RADIATING ULTRASONIC WAVES

BACKGROUND

1. Technical Field

The present disclosure relates to an electronic device, and more particularly to an audio device including transducers.

2. Description of the Related Art

An electronic device (e.g., an earphone, a speaker, an audio player, a portable device, or so on) may be equipped with sound generating units for multiple purposes. Sound generating units can generate sonic waves that are audible for users. Conventionally, these sonic waves are omnidirectional. Thus, when a user plays audio data using a conventional electronic device, the sound generated by the sound generating units of that electronic device is projected outward from the electronic device in various directions to be heard by people other than the user.

SUMMARY

In accordance with some arrangements of the present disclosure, an electronic module includes a first transducer and a second transducer. The first transducer is configured to radiate a first ultrasonic wave. The second transducer is configured to radiate a second ultrasonic wave. The first transducer and the second transducer are disposed on non-coplanar surfaces.

In accordance with some arrangements of the present disclosure, an electronic module includes a first transducer and a second transducer. The first transducer is disposed on a first surface and configured to radiate a first ultrasonic wave. The second transducer is disposed on a second surface and configured to radiate a second ultrasonic wave. A normal line that is normal to the first surface and a normal line that is normal to the second surface are configured to allow the first ultrasonic wave and the second ultrasonic wave intersect.

In accordance with some arrangements of the present disclosure, a method of forming an acoustic wave includes providing a carrier on which a first transducer and a second transducer are disposed, the first transducer and the second transducer are configured to radiate respective sound waves. The method further includes forming the acoustic wave by demodulating the sound waves.

Common reference numerals are used throughout the drawings and the detailed description to indicate the same or similar components. The present disclosure can be readily understood from the following detailed description taken in conjunction with the accompanying drawings.

DETAILED DESCRIPTION

Figure 1:
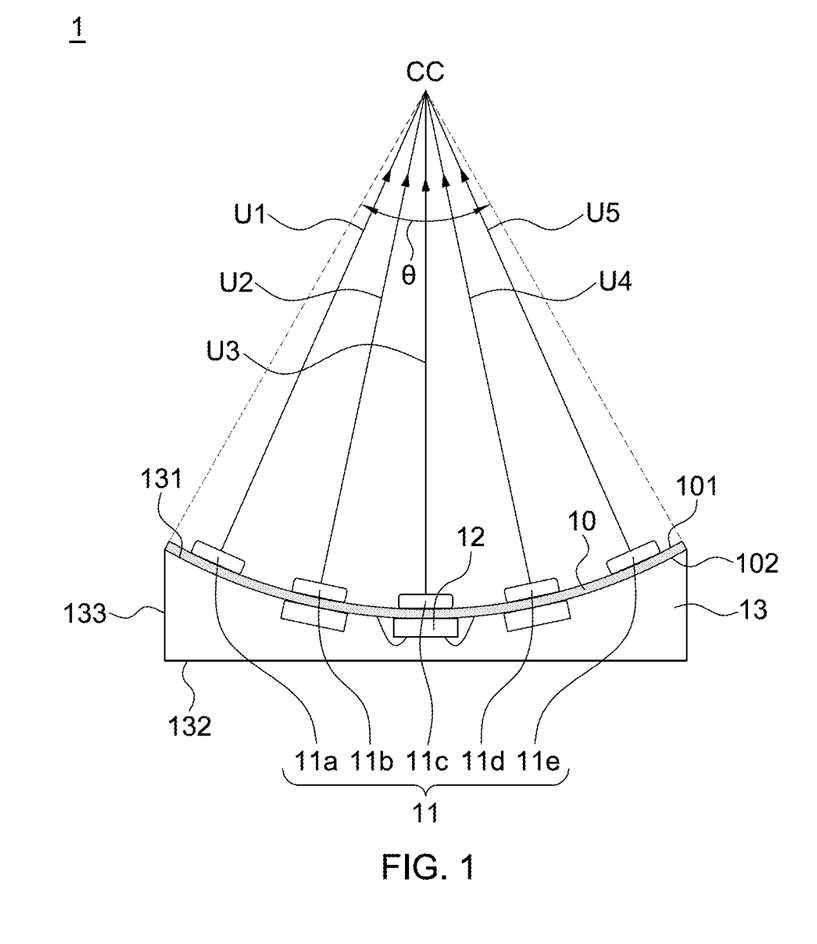
FIG. 1 illustrates a cross-sectional view of an electronic module, in accordance with some arrangements of the present disclosure.

Arrangements disclosed herein relate to systems, apparatuses, and methods for providing an electronic device that can generate directional sonic waves for one or more specific users of the electronic device. FIG. 1 illustrates a cross-sectional view of an electronic module 1, in accordance with some arrangements of the present disclosure. The electronic module 1 includes a substrate 10, a set of transducers 11, an electronic component 12, and a package body 13. In some embodiments, the electronic module 1 may include a carrier (which may be a substrate, a circuit, or an electronic component). In some arrangements, the electronic module 1 may be included in an electronic device that can be configured to generate audio information for at least one user of the electronic device. Said electronic device may be (or include) a cellular phone, a desktop computer, a laptop computer, a personal digital assistant (PDA), a tablet computer, a television, an earphone, a smart watch, a smart wearable (e.g., a smart band, smart glasses, a smart ring or bracelet, and so on), a speaker, or so on.

The substrate 10 may include, for example, one or more of a printed circuit board, such as a paper-based copper foil laminate, a composite copper foil laminate, a polymer-impregnated glass-fiber-based copper foil laminate, and so on. The substrate 10 may include an interconnection structure, such as a redistribution layer (RDL) and/or a grounding element. In some arrangements, a shape of the substrate 10 may be configured to be adjustable. For example, an outline of the substrate 10 is pliable, flexible, bendable, and/or twistable. For example, the outline of the substrate 10 can be adjusted to have a shape that conforms to any structure (e.g., a straight/flat or a non-straight/non-flat structure) of the electronic device. In some arrangements, the substrate 10 may include a flexible printed circuit (FPC). As an example, as shown in FIG. 1, the substrate 10 is adjusted to have curved surfaces 101 and 102. For example, the surface 101 may be a concave surface facing a location CC and away from a package body 13, and the surface 102 may be a convex surface facing the package body 13 and away from the location CC. In some arrangements, a central angle θ defined by edges of the substrate 10 is about 120 degrees. In other arrangements, the central angle θ defined by edges of the substrate 10 can be adjusted depending on different applications (e.g., the differences between the electronic device and a user or the size of the electronic device). For example, the central angle θ defined by edges of the substrate 10 can be less than 120 degrees or greater than 120 degrees. In other arrangements, the substrate 10 may be configured or otherwise adjusted to have any other shapes depending on different requirements.

The set of transducers 11 may include one or more transducers. In the example shown in FIG. 1, the transducers 11 include transducers 11a, 11b, 11c, 11d, and 11e. The transducers 11a, 11b, 11c, 11d, and 11e are disposed on the surface 101 (e.g., the concave surface) of the substrate 10. In some arrangements, the transducers 11a, 11b, 11c, 11d, and 11e can be electrically connected with the substrate 10 through, for example, flip-chip, wire bonding, or any other suitable techniques. In some examples and as shown in FIG. 1, the transducers 11a, 11b, 11c, 11d, and 11e are arranged directly on the surface 101 and directly contact the surface 101. The transducers 11a, 11b, 11c, 11d, and 11e are disposed on noncoplanar surfaces (e.g., on the curved surface 101). For example, the transducers 11a, 11b, 11c, 11d, and 11e are arranged on different surfaces (e.g., different portions of the surface 101) that are noncoplanar. In addition, the transducers 11a, 11b, 11c, 11d, and 11e may have different elevations relative to a bottom surface (e.g., the surface 132) of the package body 13, where the bottom surface is opposite to a top surface of the package body 13 that is adjacent to or contacts the surface 102. For example, normal lines that are normal to surfaces (of the surface 101) on which the transducers 11a, 11b, 11c, 11d, and 11e are disposed are non-parallel to each other. For example, the normal lines that are normal to the surfaces on which the transducers 11a, 11b, 11c, 11d, and 11e are located intersect with one another. In some embodiments, the normal lines are configured to allow the ultrasonic waves U1, U2, U3, U4, and U5 interact with each other.

The transducers 11a, 11b, 11c, 11d, and 11e are configured to emit (e.g., radiate or transmit) ultrasonic waves U1, U2, U3, U4, and U5, respectively. For example, each of the ultrasonic waves U1, U2, U3, U4, and U5 has a frequency higher than the upper audible limit of human hearing (e.g., 20 kHz). In some arrangements, each of the ultrasonic waves U1, U2, U3, U4, and U5 has a frequency higher than 20 kHz. In some arrangements, each of the ultrasonic waves U1, U2, U3, U4, and U5 is directional, and the emission directions of the ultrasonic waves U1, U2, U3, U4, and U5 are non-parallel to each other. For example, the ultrasonic waves U1, U2, U3, U4, and U5 may be directed toward a same location CC and may intersect or cross at said location CC. In some arrangements, the location CC may be a center of curvature of the surface 101 of the substrate 10. In such arrangements, the lines representing the ultrasonic waves U1, U2, U3, U4, and U5 are radii of the curvature of the surface 101. In other arrangements, the location CC is different from the center of curvature of the surface 101 of the substrate 10. In some arrangements, each of the ultrasonic waves U1, U2, U3, U4, and U5 is substantially perpendicular to a tangent line of the surface on which the corresponding one of the transducers 11a, 11b, 11c, 11d, and 11e is disposed. In other arrangements, each of the ultrasonic waves U1, U2, U3, U4, and U5 is not perpendicular to a tangent line of the surface on which the corresponding one of the transducers 11a, 11b, 11c, 11d, and 11e is disposed.

The ultrasonic waves U1, U2, U3, U4, and U5 are interacted with each other at or adjacent to a given location, for example, the location CC. For example, the ultrasonic waves U1, U2, U3, U4, and U5 interfere with each other at or adjacent to a given location, for example, the location CC. For example, the ultrasonic waves U1, U2, U3, U4, and U5 are transmitted toward a predetermined region (e.g., the location CC), and thus the ultrasonic waves U1, U2, U3, U4, and U5 can interfere with each other to generate acoustic waves (such as audible sound waves, which are audible to a human or an animal) having a frequency substantially equal to a difference between the frequencies of two of the ultrasonic waves U1, U2, U3, U4, and U5. The ultrasonic waves U1, U2, U3, U4, and U5 are demodulated at or adjacent to a given location, for example, the location CC around a sound sensitive organ of a body (e.g., a human or an animal). For example, the ultrasonic waves U1, U2, U3, U4, and U5 are demodulated at or adjacent to a given location, for example, the location CC to form a sonic wave audible to a human (e.g., having a frequency between about 20 Hz to about 20 kHz) or an animal. In particular, the transducers 11a, 11b, 11c, 11d, and 11e can modulate the audio data/information into the ultrasonic waves U1, U2, U3, U4, and U5 and radiate the ultrasonic waves U1, U2, U3, U4, and U5 through the air from a parametric array. The parametric array radiates ultrasonic waves with a relatively high intensity and/or sound pressure level (SPL) (e.g., an SPL of around 120 dB or greater) and utilizes the non-linear characteristic of air to distort and demodulate the ultrasonic waves U1, U2, U3, U4, and U5 as the ultrasonic waves U1, U2, U3, U4, and U5 are converted into audible sound waves as the ultrasonic waves U1, U2, U3, U4, and U5 travel through air. Each of the ultrasonic waves U1, U2, U3, U4, and U5 has a relatively higher frequency and shorter wavelength as compared to the frequency and wavelength of audible sound waves, which allows the ultrasonic waves U1, U2, U3, U4, and U5 to propagate in much narrower focused beams as compared to audible sound waves that naturally spread out in all directions (e.g., omnidirectional). In some arrangements, the beams of the ultrasonic waves U1, U2, U3, U4, and U5 are converted into a beam of audible sound waves at or adjacent to a single location (e.g., the location CC) as the ultrasonic waves U1, U2, U3, U4, and U5 are demodulated by the air at or adjacent to, for example, the location CC.

In some arrangements, each of the audible sound waves generated at or adjacent to the location CC has a frequency less than the frequency of any of the ultrasonic waves U1, U2, U3, U4, and U5. In some arrangements, one of the audible sound waves generated at or adjacent to the location CC may have a frequency substantially equal to a difference between the frequencies of two of the ultrasonic waves U1, U2, U3, U4, and U5. In some arrangements, the ultrasonic waves U1, U2, U3, U4, and U5 all have different frequencies. In some arrangements, the ultrasonic waves U1, U2, U3, U4, and U5 all have different phases and/or amplitudes. In other arrangements, two or more of the ultrasonic waves U1, U2, U3, U4, and U5 may have the same phase and/or amplitude.

Figure 2A:
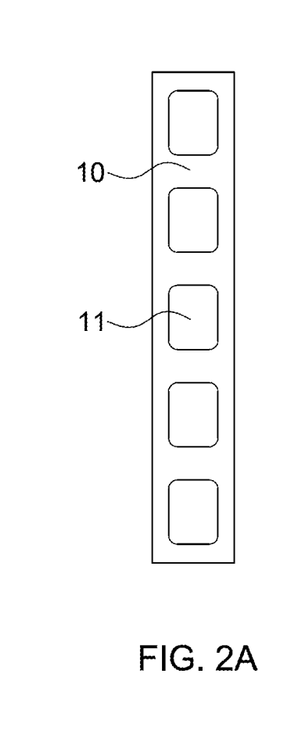
FIG. 2A illustrates a top view of an electronic module, in accordance with some arrangements of the present disclosure.
Figure 2B:
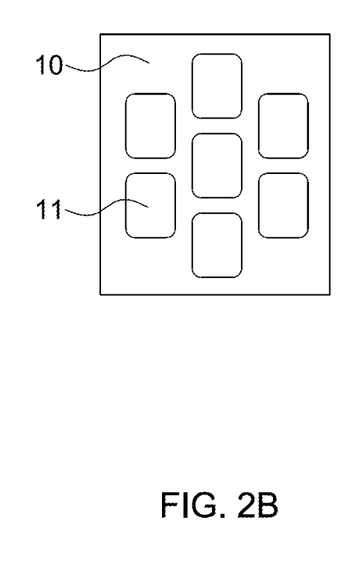
FIG. 2B illustrates a top view of an electronic module, in accordance with some arrangements of the present disclosure.
Figure 2C:
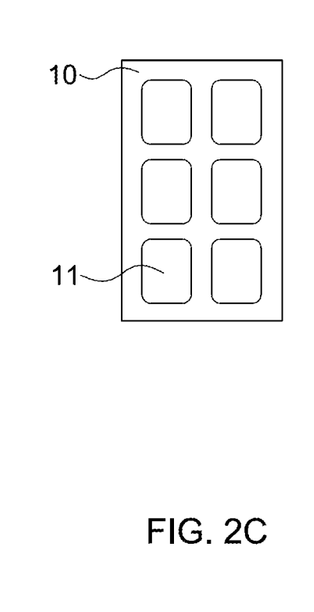
FIG. 2C illustrates a top view of an electronic module, in accordance with some arrangements of the present disclosure.
Figure 2D:
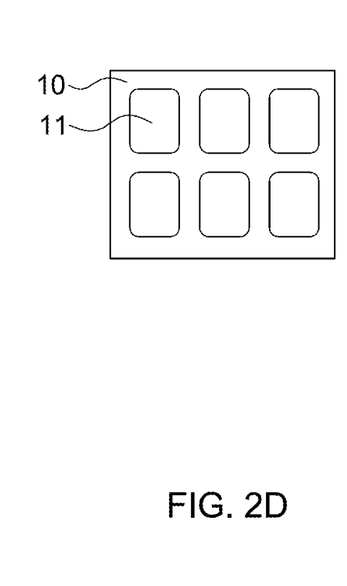
FIG. 2D illustrates a top view of an electronic module, in accordance with some arrangements of the present disclosure.

Although a specific number of transducers 11a, 11b, 11c, 11d, and 11e is illustrated in FIG. 1, it should be noted that the set of transducers 11 may include any number of transducers depending on different requirements. The set of transducers 11 may be arranged in an M×N array, where M and N are positive integers. For example, as shown in FIG. 2A, which illustrates a top view of the electronic module 1, the set of transducers 11 includes a 1×5 array. In another example, as shown in FIG. 2C, which illustrates a top view of an electronic module such as the electronic module 1, the set of transducers 11 includes a 2×3 array. In yet another example, as shown in FIG. 2D, which illustrates a top view of an electronic module such as the electronic module 1, the set of transducers 11 includes a 3×2 array. In some arrangements, the set of transducers 11 may include any other arrangements, such as the arrangement shown in FIG. 2B, which illustrates a top view of an electronic module such as the electronic module 1.

One or more electronic components 12 are disposed on the surface 102 (e.g., the convex surface) of the substrate 10. The electronic components 12 are electrically connected to the substrate 10. The electronic components 12 are electrically connected to the set of transducers 11 through, for example, the substrate 10. The electronic component 12 is configured to control the set of transducers 11. For example, the electronic components 12 are configured to adjust the frequency, the amplitude, the phase, and/or the emission direction of each of the ultrasonic waves U1, U2, U3, U4, and U5 radiated by the transducers 11a, 11b, 11c, 11d, and 11e. In some embodiments, all the transducers 11a, 11b, 11c, 11d, and 11e can be controlled or adjusted by one electronic component. Alternatively, each of the transducers 11a, 11b, 11c, 11d, and 11e can be controlled or adjusted by an individual electronic component.

Each of the electronic components 12 may include an active element or a passive element (e.g., a resistor, a capacitor, an inductor, or a combination thereof). Each of the electronic components 12 may be a chip or a die including a semiconductor substrate, one or more integrated circuit devices and one or more overlying interconnection structures therein. The integrated circuit devices may include active devices such as transistors and/or passive devices such resistors, capacitors, inductors, or a combination thereof. Each of the electronic components 12 may include a processor or a controller, such as a central processing unit (CPU), a microcontroller unit (MCU), an application specific integrated circuit (ASIC), or the like. Each of the electronic components 12 may include a wired or wireless communication module (e.g., Wi-Fi, mobile networks, Bluetooth, near field communication (NFC), or the like) to receive audio data/information to be transmitted through the set of transducers 11. Each of the electronic components 12 may include a storage device to store audio data/information to be transmitted through the set of transducers 11.

The package body 13 is disposed on the surface 102 of the substrate 10 to cover or encapsulate the electronic component 12. In some arrangements, the package body 13 includes an epoxy resin having fillers, a molding compound (e.g., an epoxy molding compound or other molding compound), a polyimide, a phenolic compound or material, a material with a silicone dispersed therein, or a combination thereof. The package body 13 may include a surface 131 in contact with the substrate 10 (e.g., the surface 102), a surface 132 opposite to the surface 131, and a lateral surface 133 extending between the surface 131 and the surface 132. The surface 131 of the package body 13 substantially conforms to the surface 102 of the substrate 10. For example, the surface 131 of the package body 13 is a curved surface. For example, the surface 131 of the package body 13 is a concave surface facing the point CC. The surface 132 may be a planar surface. In other arrangements, the surface 132 may be a curved surface.

Compared with conventional audio devices, which directly generate omnidirectional sound waves that are audible to humans, the electronic module 1 can generate the ultrasonic waves U1, U2, U3, U4, and U5 that are then demodulated into audible sound waves at or adjacent to a desirable location (e.g., the location CC). Therefore, the sound can be heard by humans only along the focused path of the beams of the ultrasonic waves U1, U2, U3, U4, and U5, such that a listener outside of the beam does not hear the sound. In other words, the demodulated audible sound can be directed toward the ears of a specific user. In some embodiments, the location CC relative to the substrate 10 can be adjusted through changing the curvature of the surface 101. For example, the more curved the surface 101 is, the less the distance from the location CC to the substrate 10. This can allow the electronic module 1 to fit into smaller spaces.

Figure 6:
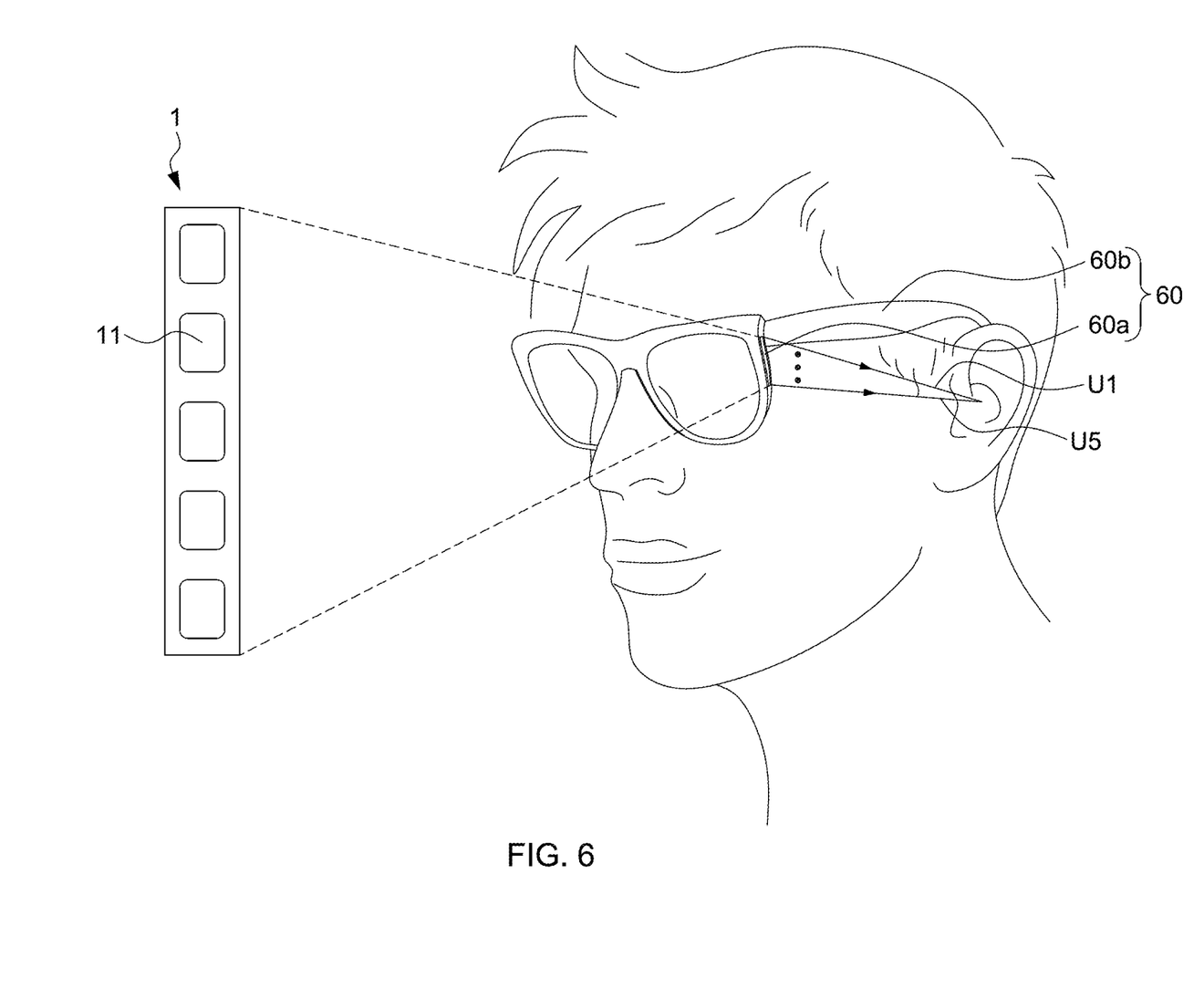
FIG. 6 illustrates a perspective view of an electrical device, in accordance with some arrangements of the present disclosure.

For example, as shown in FIG. 6 (which illustrates an electrical device including the electronic module 1 in accordance with some arrangements of the present disclosure), the electronic module 1 as shown in FIG. 1 can be integrated within a wearable device shown as glasses 60 (e.g., smart glasses). In some arrangements, the electronic module 1 can be disposed at or adjacent to rims 60a or temples 60b depending on different design specifications. When a user wears the glasses 60, the set of transducers 11 of the electronic module 1 can generate ultrasonic waves toward the ears of the user. The ultrasonic waves are demodulated at or adjacent to the user's ears to generate audible sound for the user. In other words, the location CC is at or adjacent to the user's ears. Because the ultrasonic waves are demodulated at or adjacent to the user's ears, the locations at or adjacent to the user's ears have the loudest sound. For example, the sound volume of the demodulated audible sound at or adjacent to the user's ears is higher than at any other locations (farther away from the user's ears). For example, the sound volume of the demodulated audible sound at or adjacent to the user's ears is higher than the sound volume of the demodulated sound around the transducers 60a, 60b. As such, only the user is able to hear the sound.

In some arrangements, all the transducers can be disposed on a planar surface, and the electronic component is configured to control the emission direction of the transducers so that the ultrasonic waves radiated by the transducers can be intersected and demodulated. However, frequently adjusting the emission direction of the transducers by the electronic component would increase the power consumption of the electronic module. When such electronic module is integrated into a wearable or portable device (e.g., smart glasses, an earphone, a portable speaker, a smart watch, or the like), the battery of said wearable or portable device cannot last long, which may inconvenience the user.

In accordance with the arrangements as shown in FIG. 1, because the transducers 11a, 11b, 11c, 11d, and 11e are disposed on a non-planar surface (e.g., the surface 101 with a concave shape), the ultrasonic waves U1, U2, U3, U4, and U5 can be intersected naturally without the emission direction of the transducers 11a, 11b, 11c, 11d, and 11e being additionally adjusted by the electronic component 12, which can reduce the power consumption of the electronic module 1.

In some arrangements, the electronic module 1 may be formed by the following operations: (i) providing the substrate 10 (e.g., an adjustable substrate); (ii) connecting the set of transducers 11 on the surface 101 of the substrate 10 through, for example, flip-chip, wire bonding, or any other suitable techniques; (iii) connecting the electronic component 12 on the surface 102 of the substrate 10 through, for example, flip-chip, wire bonding, or any other suitable techniques; (iv) bending the substrate 10 to form a concave surface (e.g., the surface 101) and a convex surface (e.g., the surface 102) to ensure the ultrasonic waves U1, U2, U3, U4, and U5 radiated by the transducers 11a, 11b, 11c, 11d, and 11e can be intersected; (v) forming the package body 13 on the surface 102 of the substrate 10 to cover the electronic component 12. In some arrangements, the sequences of the above operations can be changed depending on different design requirements. For example, the package body 13 may be formed prior to the operation (iv). For example, the substrate 10 may be bent prior to the operation (ii). In some arrangements, the operation (iv) may be carried out through applying force on the substrate 10 to bend the substrate 10. In other arrangements, the operation (iv) may be replaced by forming the substrate 10 to have the concave and convex surfaces with a mold device.

Figure 3:
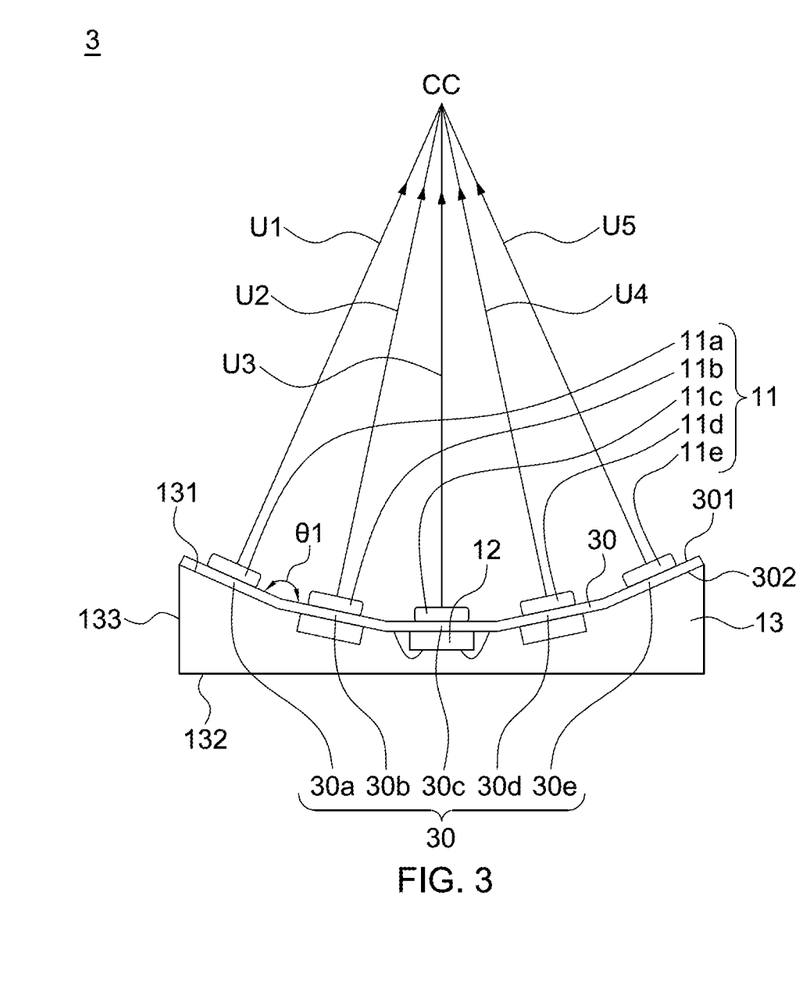
FIG. 3 illustrates a cross-sectional view of an electronic module, in accordance with some arrangements of the present disclosure.

FIG. 3 illustrates a cross-sectional view of an electronic module 3, in accordance with some arrangements of the present disclosure. The electronic module 3 is similar to the electronic module 1, and some of the differences therebetween are described below.

In FIG. 1, the substrate 10 has a curved surface (e.g., the surface 101) that is continuously and smoothly curved. In FIG. 3, the substrate 30 (or carrier) is bent into many discrete, flat portions 30a, 30b, 30c, 30d, and 30e, each of which has a planar surface (e.g., the surfaces 301 and 302) on either side. In other words, unlike the transducers 11a, 11b, 11c, 11d, and 11e as shown in FIG. 1, which are disposed on a continuous and smooth curved surface, each of the transducers 11a, 11b, 11c, 11d, and 11e as shown in FIG. 3 is disposed on a planar surface. In some arrangements, any two adjacent portions define an angle θ1 less than 180 degrees. In other words, the transducers 11a, 11b, 11c, 11d, and 11e are not disposed on a coplanar surface. For example, the transducers 11a, 11b, 11c, 11d, and 11e have different elevations relative to a bottom surface (e.g., the surface 132) of the package body 13. In some arrangements, the angle θ1 may be determined so that the ultrasonic waves U1, U2, U3, U4, and U5 can intersect naturally without additionally adjusting the emission direction of the transducers 11a, 11b, 11c, 11d, and 11e by the electronic component.

In some arrangements, the electronic module 3 may be formed by the following operations: (i) providing the substrate 30 (e.g., an adjustable substrate); (ii) connecting the set of transducers 11 on the surface 301 of the substrate 30 through, for example, flip-chip, wire bonding, or any other suitable techniques; (iii) connecting the electronic component 12 on the surface 302 of the substrate 30 through, for example, flip-chip, wire bonding, or any other suitable techniques; (iv) bending the substrate 30 into form a plurality of portions (e.g., the portions 30a, 30b, 30c, 30d, and 30e) to ensure the ultrasonic waves U1, U2, U3, U4, and U5 radiated by the transducers 11a, 11b, 11c, 11d, and 11e can intersect; (v) forming the package body 13 on the surface 302 of the substrate 30 to cover the electronic component 12. In some arrangements, the sequences of the above operations can be changed depending on different design requirements. For example, the package body 13 may be formed prior to the operation (iv). For example, the substrate 30 may be bent prior to the operation (ii).

Figure 4:
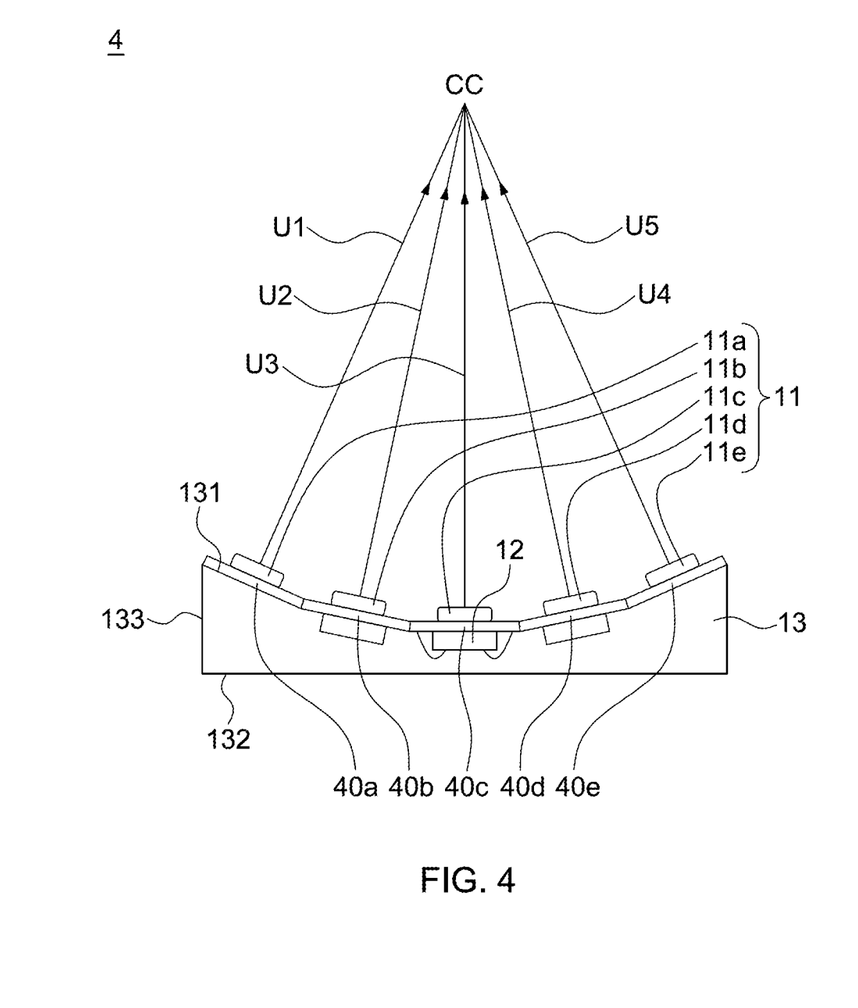
FIG. 4 illustrates a cross-sectional view of an electronic module, in accordance with some arrangements of the present disclosure.

FIG. 4 illustrates a cross-sectional view of an electronic module 4, in accordance with some arrangements of the present disclosure. The electronic module 4 is similar to the electronic module 3, and some of the differences therebetween are described below.

As shown in FIG. 3, the substrate 30 (or carrier) is a single, unitary, or monolithic substrate, which is bent into many portions 30a, 30b, 30c, 30d, and 30e. The substrate 30 is a single piece of material. In FIG. 4, the electronic module 4 has many individual substrates 40a, 40b, 40c, 40d, and 40e on which the transducers 11a, 11b, 11c, 11d, and 11e, respectively, are disposed. In some arrangements, the substrates 40a, 40b, 40c, 40d, and 40e may be physically separated from each other. Alternatively, two of adjacent substrates 40a, 40b, 40c, 40d, and 40e may be in contact with each other. In some arrangements, the substrates 40a, 40b, 40c, 40d, and 40e can be electrically connected through conductive elements (e.g., bonding wires, interposers, connecting bridges, or any other wired communication techniques). In some arrangements, the substrates 40a, 40b, 40c, 40d, and 40e can be electrically connected through capacitor coupling, electromagnetic coupling, or any other wireless communication techniques.

In some arrangements, the electronic module 4 may be formed by the following operations: (i) providing a plurality of substrates 40a, 40b, 40c, 40d, and 40e; (ii) connecting the transducers 11a, 11b, 11c, 11d, and 11e on the substrates 40a, 40b, 40c, 40d, and 40e, respectively through, for example, flip-chip, wire bonding, or any other suitable techniques; (iii) connecting the electronic component 12 on at least one of the substrates 40a, 40b, 40c, 40d, and 40e through, for example, flip-chip, wire bonding, or any other suitable techniques; (iv) arranging the substrates 40a, 40b, 40c, 40d, and 40e so that the ultrasonic waves U1, U2, U3, U4, and U5 radiated by the transducers 11a, 11b, 11c, 11d, and 11e can be intersected; (v) forming the package body 13 to cover the electronic component 12. In some arrangements, the sequences of the above operations can be changed depending on different design requirements. For example, the package body 13 may be formed prior to the operation (iv).

Figure 5:
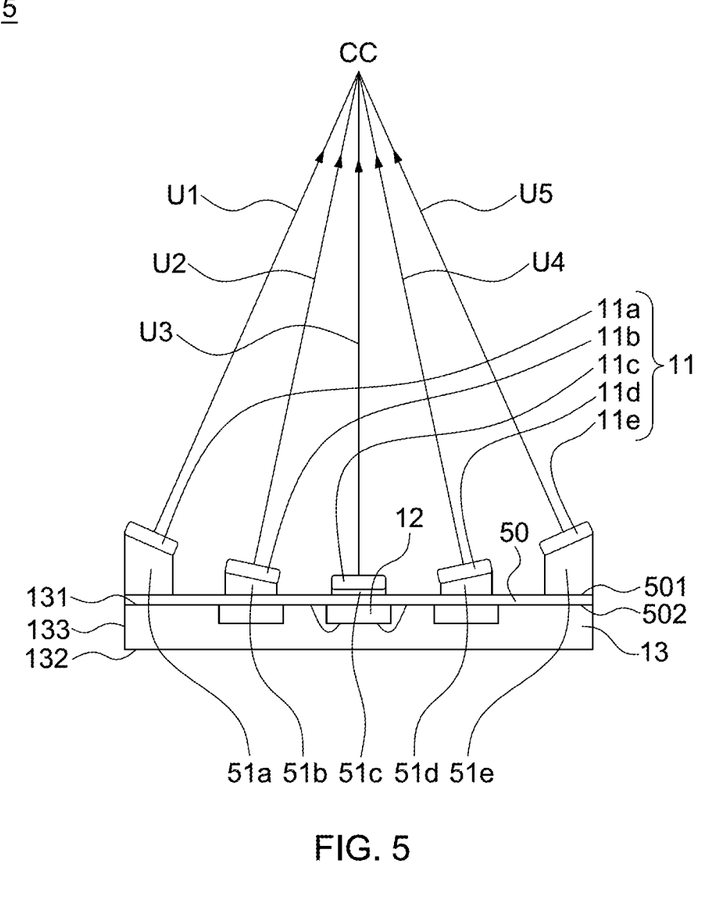
FIG. 5 illustrates a cross-sectional view of an electronic module, in accordance with some arrangements of the present disclosure.

FIG. 5 illustrates a cross-sectional view of an electronic module 5, in accordance with some arrangements of the present disclosure. The electronic module 5 is similar to the electronic module 1, and some of the differences therebetween are described below.

Unlike the substrate 10 as shown in FIG. 1, which has continuously smooth curved surfaces (the surfaces 101 and 102), the electronic module 5 has a straight substrate 50. The substrate 50 has surfaces 501 and 502, which are planar and parallel to each other. The electronic module 50 further includes support elements 51a, 51b, 51c, 51d, and 51e on which the transducers 11a, 11b, 11c, 11d, and 11e, respectively, are disposed. The support elements 51a, 51b, 51c, 51d, and 51e are configured so that the ultrasonic waves U1, U2, U3, U4, and U5 radiated by the transducers 11a, 11b, 11c, 11d, and 11e are non-parallel to each other and are intersected at or adjacent to the location CC.

In some arrangements, the surface of each of the support elements 51a, 51b, 51d, and 51e on which the corresponding transducer is disposed is not parallel to the surface 501 of the substrate 50. For example, the surface of each of the support elements 51a, 51b, 51d, and 51e is inclined, oblique, or angled with respect to the surface 501 of the substrate 50. The surface of the support element 51c on which the central transducer (e.g., the transducer 51c) is disposed may be parallel to the surface 501 of the substrate 50. In some arrangements, the support element 51c may be omitted. In some arrangements, an angle defined by the surface 501 of the substrate 50 and the surface of each of the support elements 51a, 51b, 51c, 51d, and 51e on which the corresponding transducer is disposed is different from an angle defined by the surface 501 of the substrate 50 and the surface of its adjacent support element on which the corresponding transducer is disposed.

In some arrangements, each of the support elements 51a, 51b, 51d, and 51e may include a plurality of solder balls having different diameters to make the transducers 11a, 11b, 11d, and 11e inclined with respect to the surface 501 of the substrate 50. In some arrangements, each of the support elements 51*a*, 51*b*, 51*d*, and 51*e* may include a plurality of conductive pillars having different heights to make the transducers 11*a*, 11*b*, 11*d*, and 11*e* inclined with respect to the surface 501 of the substrate 50. In some arrangements, each of the support elements 51*a*, 51*b*, 51*d*, and 51*e* may include an interposer having uneven thicknesses to make the transducers 11*a*, 11*b*, 11*d*, and 11*e* inclined with respect to the surface 501 of the substrate 50.

In some arrangements, the electronic module 5 may be formed by the following operations: (i) providing the substrate 50; (ii) forming the support elements 50*a*, 50*b*, 50*c*, 50*d*, and 50*e* on the surface 501 of the substrate 50; (iii) connecting the transducers 11*a*, 11*b*, 11*c*, 11*d*, and 11*e* on the support elements 50*a*, 50*b*, 50*c*, 50*d*, and 50*e*, respectively; (iii) connecting the electronic component 12 on the surface 502 of the substrate 50; (v) forming the package body 13 on the surface 502 of the substrate 50 to cover the electronic component 12. In some arrangements, the sequences of the above operations can be changed depending on different design requirements. For example, the package body 13 may be formed prior to the operation (iv).

As used herein, the terms "substantially," "substantial," "approximately," and "about" are used to denote and account for small variations. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. As another example, a thickness of a film or a layer being "substantially uniform" can refer to a standard deviation of less than or equal to ±10% of an average thickness of the film or the layer, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. The term "substantially coplanar" can refer to two surfaces within micrometers of lying along a same plane, such as within 40 μm, within 30 μm, within 20 μm, within 10 μm, or within 1 μm of lying along the same plane. Two surfaces or components can be deemed to be "substantially perpendicular" if an angle therebetween is, for example, 90°±10°, such as ±5°, ±4°, ±3°, ±2°, ±1°, ±0.5°, ±0.1°, or ±0.05°. When used in conjunction with an event or circumstance, the terms "substantially," "substantial," "approximately," and "about" can refer to instances in which the event or circumstance occurs precisely, as well as instances in which the event or circumstance occurs to a close approximation.

As used herein, the singular terms "a," "an," and "the" may include plural referents unless the context clearly dictates otherwise. In the description of some arrangements, a component provided "on" or "over" another component can encompass cases where the former component is directly on (e.g., in physical contact with) the latter component, as well as cases where one or more intervening components are located between the former component and the latter component.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It can be understood that such range formats are used for convenience and brevity, and should be understood flexibly to include not only numerical values explicitly specified as limits of a range, but also all individual numerical values or sub-ranges encompassed within that range as if each numerical value and sub-range is explicitly specified.

While the present disclosure has been described and illustrated with reference to specific arrangements thereof, these descriptions and illustrations do not limit the present disclosure. It can be clearly understood by those skilled in the art that various changes may be made, and equivalent elements may be substituted within the arrangements without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and such. There may be other arrangements of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. An electronic module, comprising:
   a substrate having a first surface and a second surface opposite to the first surface;
   a set of transducers disposed adjacent to the first surface of the substrate, wherein the set of transducers are arranged in an array; and
   an electronic component disposed adjacent to the second surface of the substrate and configured to control the set of transducers;
   wherein the substrate comprises an adjustable substrate and the electronic module further comprising an encapsulant configured to support the adjustable substrate.

2. The electronic module of claim 1, wherein the electronic component is configured to adjust at least one of a frequency, an amplitude, a phase, and an emission direction of ultrasonic waves radiated by the set of transducers.

3. The electronic module of claim 2, wherein the electronic component comprises a storage device to store audio data/information to be transmitted through the set of transducers.

4. The electronic module of claim 1, wherein the electronic component is aligned with the center of the array of the set of transducers.

5. The electronic module of claim 4, wherein the set of transducers are arranged in a two-dimensional array.

6. The electronic module of claim 5, wherein ultrasonic waves radiated by the set of transducers have substantially the same phase.

7. The electronic module of claim 6, wherein a normal line of the electronic component is substantially aligned with a normal line of a transducer of the set of transducers located at the center of the array.

8. The electronic module of claim 1, further comprising another electronic component configured to control at least another set of transducers.

9. The electronic module of claim 1, wherein a shape of the encapsulant is defined based on a shape of the adjustable substrate after being adjusted.

10. The electronic module of claim 9, wherein a lateral surface of the encapsulant is non-coplanar with a lateral surface of the adjustable substrate.

11. The electronic module of claim 1, wherein the substrate comprises a flexible printed circuit (FPC).

* * * * *